L. WILLIS & O. F. WOODWORTH.
SPRING ATTACHMENT FOR TEETH OF AGRICULTURAL IMPLEMENTS.
APPLICATION FILED JULY 28, 1911.
1,004,224.
Patented Sept. 26, 1911.
2 SHEETS—SHEET 1.
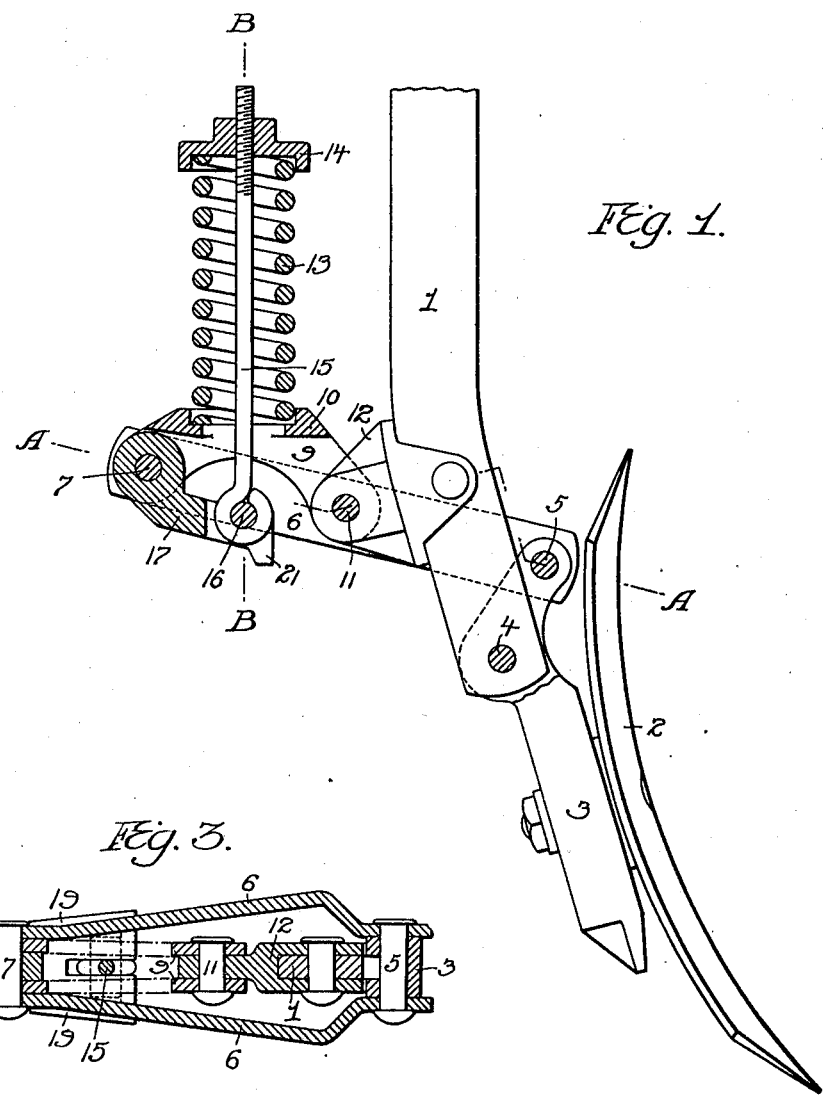
WITNESSES
Kate A. Beadle
Elsie Fullerton
INVENTORS
LELAND WILLIS AND
OLIN F. WOODWORTH
BY THEIR ATTORNEY
Harry Smith L. WILLIS & O. F. WOODWORTH.
SPRING ATTACHMENT FOR TEETH OF AGRICULTURAL IMPLEMENTS.
APPLICATION FILED JULY 28, 1911.

1,004,224.

Patented Sept. 26, 1911.

2 SHEETS—SHEET 2.

WITNESSES
Kate A. Beadle
Elsie Fullerton

INVENTORS
LELAND WILLIS AND
OLIN F. WOODWORTH
BY THEIR ATTORNEY
Harry Smith

COLUMBIA PLANOGRAPH CO., WASHINGTON, D. C.

UNITED STATES PATENT OFFICE.

LELAND WILLIS AND OLIN F. WOODWORTH, OF GRENLOCH, NEW JERSEY, ASSIGNORS TO BATEMAN MANUFACTURING COMPANY, OF GRENLOCH, NEW JERSEY, A CORPORATION OF NEW JERSEY.

SPRING ATTACHMENT FOR TEETH OF AGRICULTURAL IMPLEMENTS.

1,004,224. Specification of Letters Patent. Patented Sept. 26, 1911.

Application filed July 28, 1911. Serial No. 641,012.

*To all whom it may concern:*

Be it known that we, LELAND WILLIS and OLIN F. WOODWORTH, both citizens of the United States, residing in Grenloch, New Jersey, have invented certain Improvements in Spring Attachments for Teeth of Agricultural Implements, of which the following is a specification.

Our invention relates to spring mountings for the teeth of harrows, hoes, or like agricultural implements, one object of our invention being to so construct such spring mounting that the various pivotal points of the same cannot, when the tooth is in its normal or operative position, assume such relation to one another as to prevent the tooth from yielding when it meets with any obstruction or prevent the tooth from resuming its normal position again after it has been swung rearwardly by such obstruction and has cleared the same, a further object being to insure the effective action of the spring in all of the positions assumed by the tooth in its swinging movement, and a still further object being to reduce the number of parts adjustable by the user to but one, namely, that whereby the tension of the spring is regulated. These objects we attain in the manner hereinafter set forth, reference being had to the accompanying drawings, in which—

Figure 5:
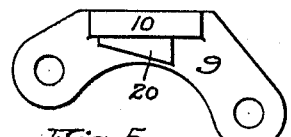
Figure 6:
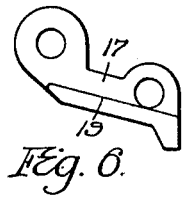
Figure 2:
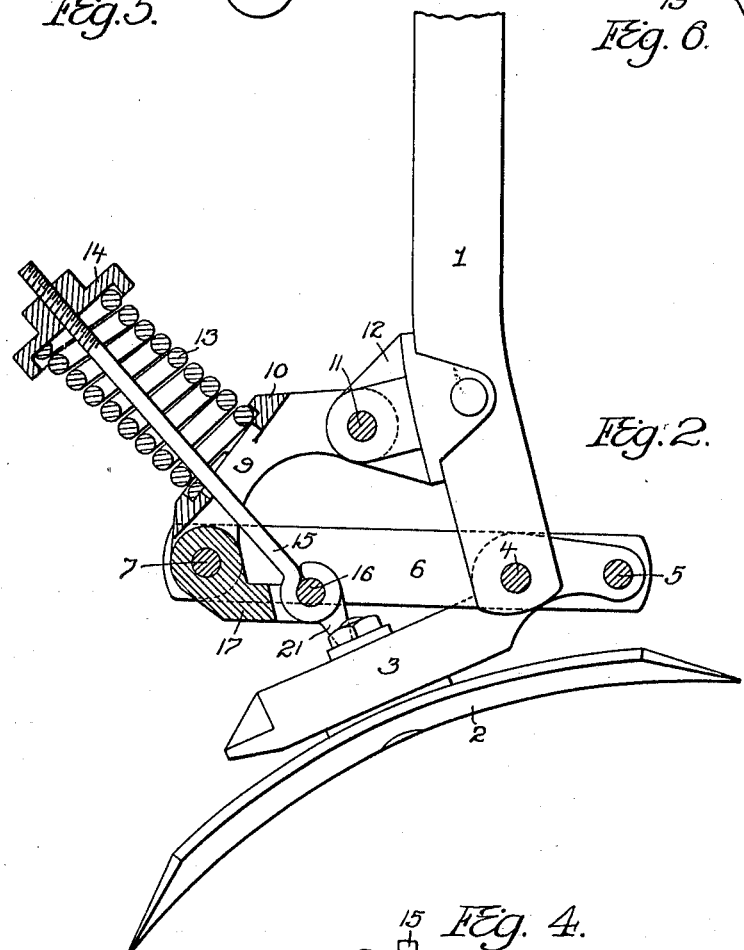
Figure 4:
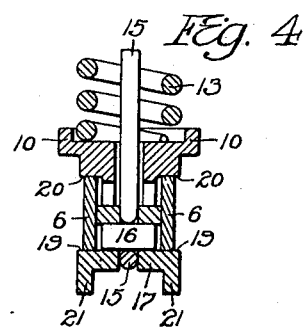

Figure 1 is a view, partly in side elevation and partly in section, of a spring mounting constructed in accordance with our invention, the tooth being shown in its normal or operative position; Fig. 2 is a similar view illustrating the tooth in the position assumed by it when it has been swung backwardly in order to clear an obstruction; Fig. 3 is a horizontal section on the line A—A, Fig. 1; Fig. 4 is a partial transverse section on the line B—B, Fig. 1, and Figs. 5 and 6 are side views of two of the members of the device.

In the drawings, 1 represents a bar depending from the main frame of the machine and 2 the tooth which is to be yieldingly mounted thereon, this tooth being fixedly secured to the lower member of a lever arm 3 which is pivotally mounted at 4 upon the lower end of the bar 1, the upper member of the said lever arm 3 being forked so as to embrace the bar 1 and being connected by a pivot pin 5 to the front ends of the pair of links 6, whose rear ends are pivoted by means of a pin 7 to the rear portions of a pair of wings 9 depending from a spring supporting cup 10, the front ends of said wings 9 being pivoted by means of a pin 11 to a bracket 12 fixedly mounted upon and projecting rearwardly from the bar 1, as shown in Figs. 1 and 2. The spring 13 is seated in the cup 10 and has at its upper end a cap plate 14 having a central threaded opening for the reception of the threaded upper end of a rod 15, whose lower end is formed into an eye which embraces a pin 16 carried by a block 17, the latter being pivotally mounted upon the pin 7, as shown in Figs. 1 and 2. The block 17 has side shoulders 19 which bear at all times against the undersides of the side links 6 and the cup 10 has shoulders 20 against which the upper faces of the side links abut when the tooth 2 is in its normal or operative position, as shown in Fig. 1, the tension of the spring 13 tending to maintain the parts in this position. When thus located the side links 6, the side wings 9 of the spring cup 10 and the three pivot pins 5, 7 and 11 constitute a toggle, the axis of the central pivot pin 11 occupying a position slightly above a line drawn through the axes of the pins 5 and 7 so that if a forward pull is exerted upon the pin 5 the toggle can break, the rear pin 7 descending and the spring cup 10 swinging downwardly upon the pin 11 as a pivot. If, however, the rearward swing of the tooth 2, when it came in contact with an obstruction which it could not throw aside, was such force as to impart a direct forward pull to the pin 5 the breaking of the toggle would require the expenditure of more force than it is advisable to exert, hence our use of the lever arm 3 upon which the tooth 2 is mounted, so that when said tooth is forced rearwardly by contact with an obstruction, said lever arm will swing upon the pivot 4 and the pin 5 will have both a forward and a downward movement, the proportion of downward to forward movement constantly increasing as the lever arm swings rearwardly, so that the bending or breaking of the toggle requires the exercise of a constantly decreasing amount of force. As the side links 6 swing downwardly their contact with the shoulders 19 on the block 17 causes the latter to swing downwardly with them, thereby causing compression of the spring 13 through the intervention of the rod 15 and cap 14, as shown in Fig. 2, rearward swinging movement of the tooth 2 being permitted until the lever arm 3 comes into contact with stop lugs 21 on the block 17, as shown in Fig. 2, by which time the tooth will have cleared any obstruction which in the operation of the tool or implement it is likely to strike and which it cannot displace. As soon as the tooth clears the obstruction the spring 13 will expand and restore the parts to their normal position, as shown in Fig. 1, the upper faces of the links 6 finally contacting with the shoulders 20 on the spring cup 10. As the toggle straightens, however, the power of the spring is exerted with less and less force, consequently, although the tooth is returned quickly from its displaced to its normal position, the latter part of the operation is so slow that the links 6 come in contact with the shoulders 20 without the exercise of any considerable degree of force and therefore without causing any injurious shock or jar to any of the parts.

The shoulders 20 on the spring cup 10 serve as a guide for setting said cup in the jig whereby the openings are bored or drilled in the wings 9 for the reception of the pivot pins 7 and 11, so that the latter pin will always bears its proper relation to the pins 7 and 5, when the parts are in the position shown in Fig. 1, there being no possibility of the three pins coming into line with one another so as to prevent the breaking of the toggle when the forward pull is exerted upon the links 6.

When the tooth 2 is swung backward the lever arm 3, links 6 and spring cup 10 constitute another toggle having the three pivots 4, 5 and 7, and the stop lugs 21 on the block 17 prevent the lever arm 3 from swinging so far backward as to bring these three pivot pins in line, and thus locking the parts. In this respect our invention is an improvement upon that class of spring mountings which employ a set screw or other adjustable stop for changing the relative position of toggle centers which regulate the amount of force necessary to break the toggle in order that the tooth may clear an obstruction, as such adjustable stops are susceptible of being wrongly set so as to fail to perform their intended function. In our improved mounting the only adjustable member is the cap 14 which regulates the tension of spring.

We claim:

1. The combination, in a spring mounting for teeth of agricultural implements, of the fixed bar, a lever arm pivoted thereto and carrying the blade or tooth, a spring-supporting cup pivotally mounted on the fixed bar, a spring mounted in said cup, links connecting the tooth-carrying lever arm to said spring cup, and a block connected to the spring and pivoted to the spring-supporting cup and to the links, said block having shoulders upon which the links bear, whereby, under the tension of the spring, it is maintained in constant contact with said links.

2. The combination, in a spring mounting for teeth of agricultural implements, of the fixed bar, a lever arm pivoted thereto and carrying the blade or tooth, a spring-supporting cup pivotally mounted on the fixed bar, a spring mounted in said cup, links connecting the tooth-carrying lever arm to said spring cup, and a block connected to the spring and pivoted to the spring-supporting cup and to the links, said block having shoulders upon which the links bear, whereby, under the tension of the spring, it is maintained in constant contact with said links, and said block being provided with stop lugs which serve to limit the rearward swinging movement of the tooth-carrying lever arm.

3. The combination, in a spring mounting for teeth of agricultural implements, of the fixed bar, a lever arm pivoted thereto and carrying the blade or tooth, a spring-supporting cup pivotally mounted on the fixed bar, a spring mounted in said cup, links connecting the tooth-carrying lever arm to said spring cup, and a block connected to the spring and pivoted to the spring-supporting cup and to the links, said block having shoulders upon which the links bear, whereby, under the tension of the spring, it is maintained in constant contact with said links, and the spring-supporting cup being provided with shoulders which contact with the links when the tooth is in its normal or operative position.

4. The combination, in a spring mounting for the tooth or blade of an agricultural implement, of the fixed bar, a lever arm pivoted thereto and carrying the blade or tooth, a spring-supporting cup pivotally mounted on the arm, a spring mounted in said cup, and links connecting said tooth-carrying lever arm to said spring-supporting cup, said members constituting a toggle having three pivotal connections so disposed that when the tooth is in the normal or operative position the axis of the central pivot is above a
5 line drawn through the axes of the front and rear pivots.

In testimony whereof, we have signed our names to this specification, in the presence of two subscribing witnesses.

LELAND WILLIS.
OLIN F. WOODWORTH.

Witnesses:
HARRY SNYDER,
L. F. TYSON.

Copies of this patent may be obtained for five cents each, by addressing the "Commissioner of Patents, Washington, D. C."